(12) United States Patent
Yan

(10) Patent No.: US 9,602,480 B2
(45) Date of Patent: Mar. 21, 2017

(54) METHODS AND APPARATUS FOR DATA ACCESS CONTROL

(71) Applicant: Nokia Technologies Oy, Espoo (FI)

(72) Inventor: Zheng Yan, Shaanxi (CN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/435,843

(22) PCT Filed: Oct. 26, 2012

(86) PCT No.: PCT/CN2012/083601
§ 371 (c)(1),
(2) Date: Apr. 15, 2015

(87) PCT Pub. No.: WO2014/063361
PCT Pub. Date: May 1, 2014

(65) Prior Publication Data
US 2015/0281193 A1    Oct. 1, 2015

(51) Int. Cl.
*H04L 29/06*        (2006.01)
*H04L 9/08*         (2006.01)
*G06F 21/62*        (2013.01)

(52) U.S. Cl.
CPC ............ *H04L 63/061* (2013.01); *G06F 21/62* (2013.01); *H04L 9/085* (2013.01); *H04L 63/0853* (2013.01)

(58) Field of Classification Search
CPC ...... H04L 9/085; H04L 9/0819; H04L 9/0861
See application file for complete search history.

(56) References Cited

U.S. PATENT DOCUMENTS 6,598,161 B1 *  7/2003  Kluttz ................. G06F 21/6209
                                                        713/166
2006/0179489 A1 *  8/2006  Mas Ribes ............. H04N 5/913
                                                        726/27
(Continued)

FOREIGN PATENT DOCUMENTS

CN          101589400 A          11/2009
CN          102244576 A          11/2011
(Continued)

OTHER PUBLICATIONS

Translation of Abstract of 2006-345160. Dec. 2006.*
(Continued)

*Primary Examiner* — Jason K Gee
(74) *Attorney, Agent, or Firm* — Mintz Levin Cohn Ferris Glovsky and Popeo, P.C.

(57) ABSTRACT

Systems and techniques for controlling access to data are described. Data is delivered to a repository in such a way that access to the data can be controlled, for example, by encrypting the data before delivery. The power to provide a requester with the ability to gain access to the data is divided, so that multiple entities can provide the requester with a portion of the information needed to gain access to the data. The portions of the information may be partial keys that can be assembled into a complete key. The requester can gain access to the data only if it receives all portions of the information needed to gain access to the data, and different criteria may be used to decide whether or not to provide each portion of the information to the requester.

24 Claims, 4 Drawing Sheets

(56) References Cited

U.S. PATENT DOCUMENTS

| | | | | |
|---|---|---|---|---|
| 2009/0013172 A1* | 1/2009 | Ju | ................... | G11B 20/00086 |
| | | | | 713/150 |
| 2011/0099203 A1 | 4/2011 | Fastring | | |
| 2012/0054827 A1* | 3/2012 | Hom | ................... | G06F 21/552 |
| | | | | 726/2 |
| 2012/0076300 A1* | 3/2012 | Uchida | ............... | H04L 9/0822 |
| | | | | 380/255 |
| 2012/0166806 A1* | 6/2012 | Zhang | ................. | H04L 9/3247 |
| | | | | 713/176 |

FOREIGN PATENT DOCUMENTS

| | | | |
|---|---|---|---|
| JP | 2006-345160 | * | 12/2006 |
| JP | 2010103943 A | | 5/2010 |

OTHER PUBLICATIONS

Machine Translation of Specification of 2006-345160. Dec. 2006.*
International Search Report and Written Opinion received for corresponding Patent Cooperation Treaty Application No. PCT/CN2012/083601, dated Aug. 1, 2013, 11 pages.
Adamouski et al., Encryption technology other than PKI. Security Technology. Proceedings 32nd Annual 1998 Internal Carnahan Caonference on Alexandria. Oct. 1998. pp. 108-116.
Yi-Jun He et al., Non-Transferable Proxy Re-Encryption Scheme for Data Dissemination Control. International Association for Cryptologic Research. V20110331:110725;Mar. 31, 2011. p. 1-30.

* cited by examiner

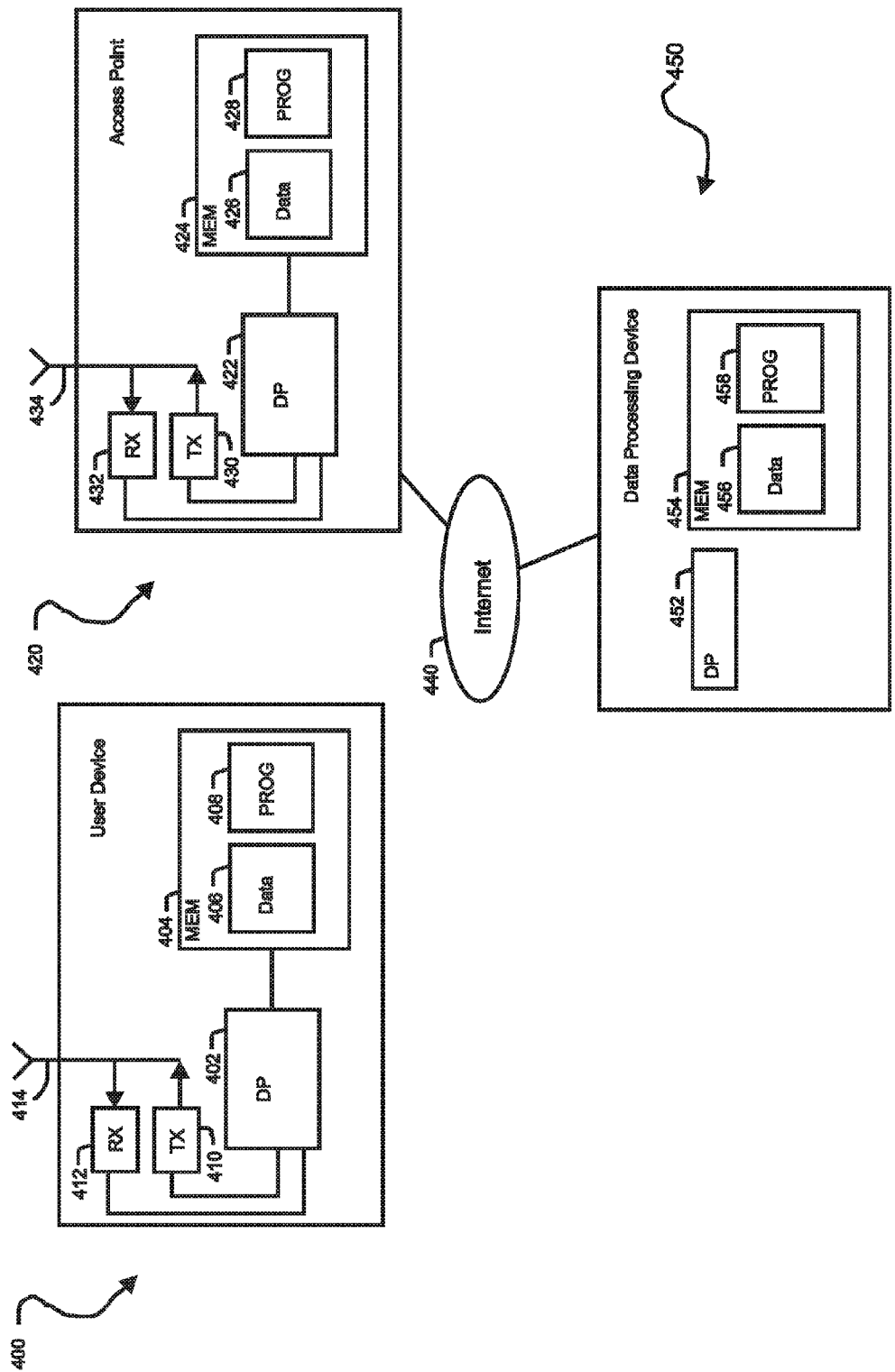

US 9,602,480 B2

METHODS AND APPARATUS FOR DATA ACCESS CONTROL

RELATED APPLICATION

This application was originally filed as Patent Cooperation Treaty Application No. PCT/CN2012/083601 filed Oct. 26, 2012.

FIELD OF THE INVENTION

The present invention relates generally to data storage and security. More particularly, the invention relates to control of data access of requesters by multiple controllers in a heterogeneous manner.

BACKGROUND

More and more data users store large volumes of data remotely. Such an approach provides many conveniences for users, allowing users access to their data. Such access is, to a great extent, independent of a user's location and of the device a user may be employing to gain access to the data. Remote storage of data also allows users to share data with service providers who can use the data to provide better and more convenient services to the users.

The more data a user can store remotely, and the more data the user can share with other parties as desired, the more convenience a user can enjoy in the use of his or her data. However, much of a user's data is more or less private and a user wishes to be able to prevent access to such data by unknown or distrusted parties. On the other hand, learning the identities and trustworthiness of all parties that may handle the data deprives the user of much of the convenience that can be offered by remote data storage. It would be convenient for a user to be able to deliver his or her data without knowing which parties might be involved in handing or transfer of data from time to time, but protect sensitive data so that the data could be used only by parties satisfying criteria for access.

SUMMARY OF THE INVENTION

In one embodiment of the invention, an apparatus comprises at least one processor and memory storing computer program code. The memory storing the computer program code is configured to, with the at least one processor, cause the apparatus to at least generate a complete key usable by a data requester for decryption of stored data, divide the complete key into at least a first and a second partial key, and control delivery of the at least the first and the second partial key to a data requester according to specified criteria, wherein the criteria for delivery of the first key may be different from the criteria for delivery of the second key.

In another embodiment of the invention, a method comprises generating a complete key usable by a data requester for decryption of stored data, dividing the complete key into at least a first and a second partial key, and controlling delivery of the at least the first and the second partial key to a data requester according to specified criteria, wherein the criteria for delivery of the first key may be different from the criteria for delivery of the second key.

In another embodiment of the invention, a computer readable medium stores a program of instructions. Execution of the program of instructions by a processor configures an apparatus to at least generate a complete key usable by a data requester for decryption of stored data, divide the complete key into at least a first and a second partial key, and control delivery of the at least the first and the second partial key to a data requester according to specified criteria, wherein the criteria for delivery of the first key are different from the criteria for delivery of the second key.

BRIEF DESCRIPTION OF THE DRAWINGS

FIG. 4 illustrates elements for carrying out operations according to embodiments of the present invention.

DETAILED DESCRIPTION

Embodiments of the present invention recognize that users who wish to control their private data may do so by encrypting the data. A data owner may encrypt data and then deliver the encrypted data to a data storage service provider, such as a cloud service provider. The cloud service provider need not necessarily be trusted by the data owner, because it cannot decrypt the data. Access to data could be controlled by multiple parties if needed using one or more keys. The one or more keys may be, for example, partial keys of the decryption key. Embodiments of the invention recognize that a user may allow access to data by different requesters based on criteria related to the requester's reputation and an individual evaluation conducted by the data owner.

Figure 1:
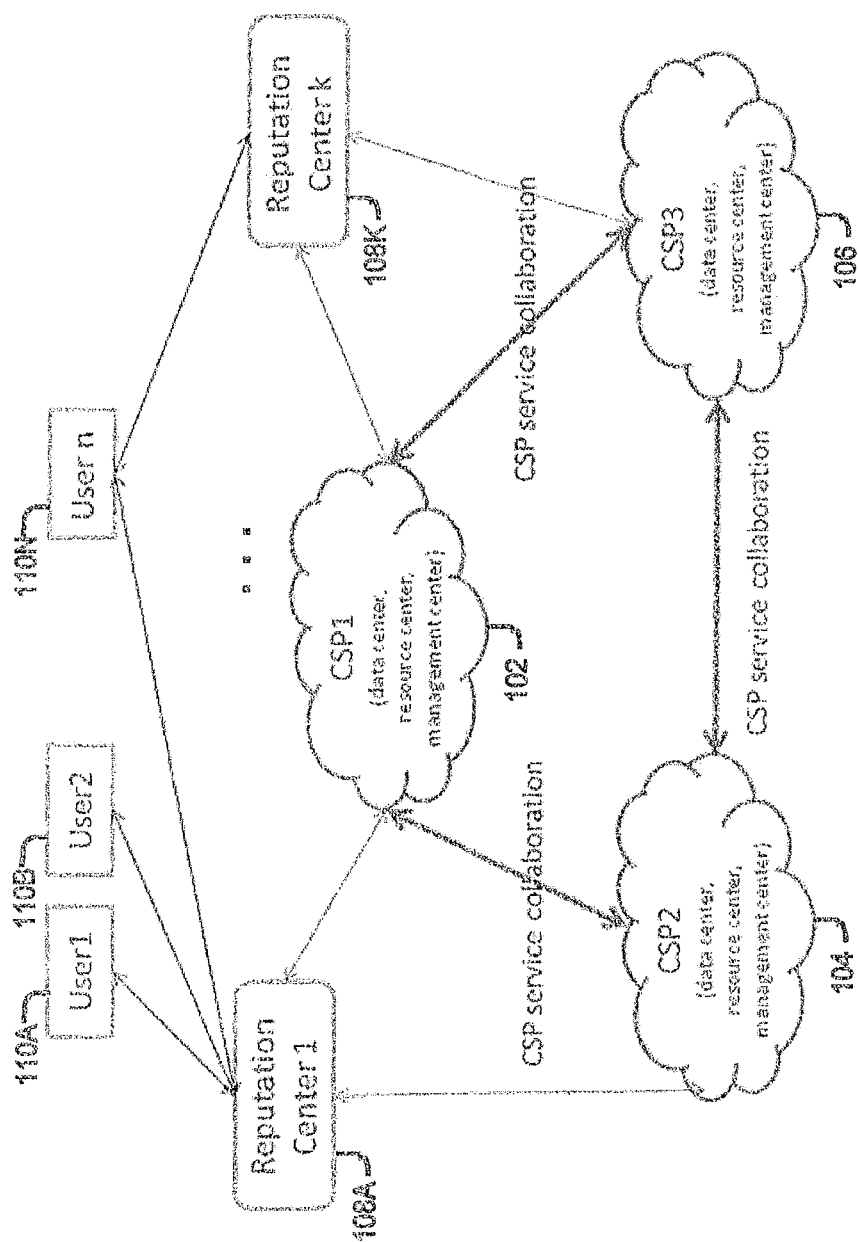
FIG. 1 illustrates a system according to an embodiment of the present invention.

FIG. 1 illustrates a data storage and delivery system 100 with which one or more embodiments of the present invention may be used. The system 100 comprises a plurality of cloud service providers (CSPs) 102, 104, and 106, which may engage in CSP service collaboration as needed to achieve a requested storage capacity. The system 100 further comprises reputation centers 108A, . . . , 108K, and may support any number of users 110A, 110B, . . . , 110N. One or more embodiments of the invention provide for multidimensional control of data access, such as access to data delivered to a cloud service provider, such as the CSP 102, for storage. Access may be granted, for example, based on individual trust evaluation performed by the data owner and/or by a public reputation evaluated by one or more reputation centers such as the reputation centers 108A, . . . , 108K.

In an example, a data owner encrypts his or her data with a secret key K, which may be a symmetric secret key. The key K may be separated into two parts, which may be referred to as K1 and K2. The key K1 is encrypted with the public key $pk\_RC_{108A}$ of the reputation center 108A. The key K2 is encrypted with a public attribute key pk_IT associated with an individual trust attribute. The encrypted data and the encrypted K1 and K2 of the key K are uploaded to the CSP 102. To gain access to the data, a user delivers a request to the CSP. The CSP consults a blacklist to determine if the user appears in the blacklist. If the user is not in a blacklist, the CSP 102 forwards the request to the reputation center 108A, the data owner, or both. The CSP 102 may also forward the user's request to the data owner so that the data owner can understand who has been requesting his or her data. If the owner determines that the requester is trustworthy, based on the reputation or the data owner's own understanding of or experience with the requester, the data owner may deliver the K2's decryption key to the requester, suitably employing the requester's public key. If the reputation center 108A identifies that the requester is reputable, the reputation center 108A re-encrypt the encrypted K1 for the access of the requester, suitably employing the requester's public key, the reputation center 108A's private key and public key. If the requester is denied access to the data, the reputation center 108A, the data owner, or both, may instruct the CSP 102 (and, if desired, the CSPs 104 and 106) to add the requester to an access blacklist, so that a CSP that includes the requester in its blacklist will block future access attempts. If the requester becomes eligible for access to the data, the CSP may be notified that the requester may be removed from the blacklist or added to a whitelist.

K1 and K2 can be flexibly defined based on different application scenarios. If the data owner wishes to exercise full control over data access, K1 can be set to null and K2 can be set to K, so that delivering K2 delivers access to the data. If the data owner allows the reputation center to control data access without a need for involvement by the data owner, K1 can be set to K and K2 can be set null. If the data owner wishes to control data access by both individual trust and public reputation—that is, through participation of both the owner and the RC)—neither K1 nor K2 is null, and aggregating K1 and K2 yields K. If the data owner wishes for access to data to be achievable through either individual trust or public reputation evaluation (through grant by either the data owner or the reputation center), the values of both K1 and K2 can be set to K. If the data owner wishes for the data to be freely accessible, K1, K2, and K can all be set null.

In one or more embodiments of the invention, the key K can be divided not merely into one part, but into multiple parts. Such an approach, and variations on the approach, can support varied control strategies—for example, control of data access by multiple reputation centers to provide assurances of privacy and security. With such an approach, a data owner can distribute the key K among multiple reputation centers in such a way that it does not need to deliver a portion of the key itself. The data owner can encrypt portions of the key K with each reputation center's public key, reducing the chance that a requester will be able to pretend to a better reputation than it should have, because fooling a single reputation center will not provide access to the data.

In an example, a mobile user may save sensitive personal data, such as sensitive identification data or health data, at a data center offered by a cloud service provider, such as the CSP 102. In order to prevent disclosure of data by the CSP 102, the user encrypts the data to limit access. The user wishes to insure that only an entity that he or she personally trusts, that has a good public reputation with regard to his health treatment, or both, can access the data. In many scenarios, a number of CSPs could collaborate to offer a complete service, with not all of them having direct interaction with the user. Such an approach makes it difficult for the data owner to decide how to manage data access that could be requested by different entities. In one or more embodiments, the invention achieves data access based on trust, in a heterogeneous manner, in order to support various control scenarios and strategies.

Every user u maintains a public user key pk_u, which is used by a data owner to generate personalized secret attribute keys; and a secret key sk_u, which is used in the decryption operation related to pk_u. The user can be a data owner or a data requester. Each user is able to verify the individual trust of an entity or user of the system 100, such as a user, a CSP, or other user or component. Potential data requesters might include a CSP, a person or organization seeking to use data, or other entities.

Each reputation center maintains a public key pk_RC and a secret key sk_RC. The data owner generates a symmetric key K to protect its personal data. The symmetric key can be divided into a number of parts K1, K2, . . . , Kn, depending on the data owners data access control policy. In one approach, K is separated into two parts: K1 and K2, and this separation allows for control of data by the data owner, a reputation center, or both, based on individual trust and/or public reputation.

Attribute-based encryption may achieve data access control based on an individual trust level as evaluated by a data owner. The data owner can issue K2 to a number of eligible users, conveniently referred to here as requester r, at the same time with one encryption computation, but different users are unable to collude with each other. Each user, for example, a data owner, maintains a secret key sk_u that is used to issue secret attribute keys to eligible users based on individual trust, with individual trust being evaluated by the user—for example, the data owner. The public representation of the individual trust is designated as (IT). The secret key sk_u can also be used to generate the public key of attributes IT and other attributes, such as time for protecting the data of user u. For the attribute IT, there is a public key, respectively denoted pk_IT, which is generated by the user u and is used to encrypt K2 in order to control data access based on the individual trust level. The corresponding secret attribute keys of pk_IT, personalized for eligible users, are issued by the user u to the eligible users. To prevent collusion, every user is given a different secret attribute key that only it can use. A secret attribute key of an attribute IT, issued for an requester r by user u is denoted as SK_(IT, u, r). The set of secret keys possessed by a user r (that is, the key SK_r and SK_(IT, u, r) may be referred to as its key ring.

One or more embodiments of the invention employ proxy re-encryption, enabling a reputation center to issue K1 to an authorized user. Proxy re-encryption allows a proxy, such as a reputation center to transform a ciphertext computed under the RC's public key into one that can be decrypted using a user's privacy key. During ciphertext transformation, referred to as re-encryption, the proxy (in this case the RC) learns nothing about the underlying plaintext of K1.

A proxy re-mechanism may be represented as a-tuple of (possibly probabilistic) polynomial time computations (KG; RG; E; R; D):

- (KG; E; D) are standard key generation, encryption, and decryption for an underlying public key encryption scheme. On input of a security parameter, KG outputs a public and private key pair (pk_A; sk_A) for entity A. On input of pk_A and data m, E outputs a ciphertext CA=E(pk_A; m). On of input sk_A and ciphertext CA, D outputs the plain data in D(sk_A; CA).
- On input of (pk_A; sk_A; pk_B), the re-encryption key generation algorithm outputs a re-encryption key rk_A→B for the proxy.
- On input of rk_A→B and ciphertext CA, the re-encryption function outputs R(rk_A→B; CA)=E(pk_B; m)=CB which can be decrypted using the private key of entity B, that is sk_B.

The following table presents and defines various keys used in one or more embodiments of the present invention. The key K is the encryption key used by a data owner to encrypt data. The keys K1 and K2 are partial keys that can be aggregated to yield K. The key pk_u is the public key of user u, comprising a unique identifier for the user and a key for verification of the user's attributes and for generation of personalized secret keys. The key sk_u is the secret key of user u, used for decryption to obtain a personalized secret attribute key. The key pk_(IT, u) is the public key of the attribute Individual Trust generated by user u used for encryption of K2 generated by user u. The key sk_(IT, u) is secret key of the attribute Individual Trust generated by user ii used for decryption of K2 generated by user u.

The key pk_RC is the public key of a reputation center RC, used for generation of a re-encryption key at RC. The key sk_RC is the secret key of a reputation center RC, also used for generation of a re-encryption key at RC.

The key rk_RC→u is a re-encryption key for decrypting a ciphertext computed under RC's public key into one that can be decrypted using u's secret key, and is used for decrypting the partial key K1.

| Key | Description | Usage |
| --- | --- | --- |
| K | Data encryption key | Encrypting data |
| K1, K2 | Parts of K | Aggregating to yield K |
| pk_u | Public key of user u | Unique ID of user and key for verification of user's attributes and generation of personalized secret attribute keys |
| sk_u | Secret key of user u | Decryption (to obtain personalized secret attribute key) |
| pk_(IT, u) | Public key of attribute Individual Trust generated by user u | Encryption (of K2 generated by user u) |
| sk_(IT, u, r) | Secret key of attribute Individual Trust for user r generated by user u | Decryption (of K2 generated by user u) |
| pk_RC | Public key of RC | Generation of re-encryption key at RC |
| sk_RC | Secret key of RC | Generation of re-encryption key at RC |
| rk_RC→ u | Re-encryption key to decrypt a ciphertext computed under RC's public key into one that can be decrypted using u's secret key | Decryption of part of key K: K1 |

In one or more embodiments of the invention, a number of computations are performed:

CreateEnctyptionKey( ):
  generates a symmetric key K to encrypt data.
DivideKey(K, n):
  divides input K into n parts.
CombineKey(K1, K2, . . . , Kn, n):
  aggregates partial keys (K1, K2, . . . , Kn) together to yield a complete key K.
CreateIndividualTrustPK(IT, sk_u):
  executed by data owner's (user u's) device to control the access of user u's data based on individual trust evaluation. If user's data access policies indicate control based on individual trust, a public attribute key is generated for the IT of user u, denoted pk_(IT, u), otherwise outputs NULL.
IssueIndividualTrustSK(IT, sk_u, r, pk_r):
  executed by the user u's device to check the eligibility of r. The algorithm checks whether the user r with public key pk_r is eligible to be granted access to data based on the attribute IT. That is, a trust level ascribed to r is equal or above an indicated level). If this is the case, IssueIndividualTrustSK outputs a secret attribute key sk_(IT, u, r) for user r. Otherwise, the function outputs NULL.
Encrypt2(K2, pk_(IT,u)):
  Processes as inputs the partial key K2 and the public keys pk_(IT,u), corresponding to the individual trust occurring in the data access policy A of user u. The function encrypts K2 according to the policy A and produces as an output the cipher-key CK2. This process is conducted at a data owner device to protect its personal data. The owner publishes the data and cipher-key CK2 to the CSP.
Decrypt2(CK2, sk_r, sk_(IT, u, r)):
  Processes as inputs cipher-key produced by the Encrypt2 function and a key ring sk_r, sk_(IT: u, r) for user r. Decrypt2 decrypts the cipher-key CK2 and outputs the corresponding plain key K2 if the trust level of r attribute is sufficient to satisfy the policy that the data owner is used to govern encryption; otherwise, NULL is produced as an output.
ReencryptionKeyGeneration(pk_RC, sk_RC, pk_r)
  Processes inputs (pk_RC; sk_RC; pk_u), generates the re-encryption key rk_RC→u for a data requester r if it satisfies the access policy of the data owner based on the latest reputation evaluation on r at RC. The RC then forwards rk_RC→r to the CSP.
Encrypt1(pk_RC, K1):
  A data owner encrypts its partial secret key K1 using the public key of the RC to obtain E(pk_RC, K1) and publishes it along with its data to the CSP.
ReEncryption(rk_RC→r; E(pk_RC; K1)):
  If a data requestor r is allowed to access the data, the CSP computes ReEncryption(rk_RC→r; E(pk_RC; K1))=E (pk_r; K1)=CK1 and gives it to the requestor r. The entity r decrypts E(pk_r; K1) using its private key sk_r to obtain K1 and uses it to gain a complete key. In one or more embodiments of the invention, the CSP functions as the proxy in a proxy re-encryption. That is, the CSP indirectly distributes a partial secret key for data decryption to authorized data requestors while without learning anything about the secret information (for example, the partial key K1 and the data). It is also noted that the CSP does not provide the user's protected data to the RC.
Decrypt1(sk_r, E(pk_r; K1)):
  Processes as inputs a cipher-key E(pk_r; K1)=CK1 (produced by ReEncryption) and sk_r. Decrypt1 decrypts the cipher-key and outputs the corresponding plain key K1.
Encrypt(K, M):
  Processes K and data M to generate encrypted data CT. The data owner publishes CT to the CSP.
Decrypt(CT, CombineKey(K1, K2,2)):
  Processes as an input a ciphertext CT produced by Encrypt and all parts of K to output the plaintext M.

Figure 2:
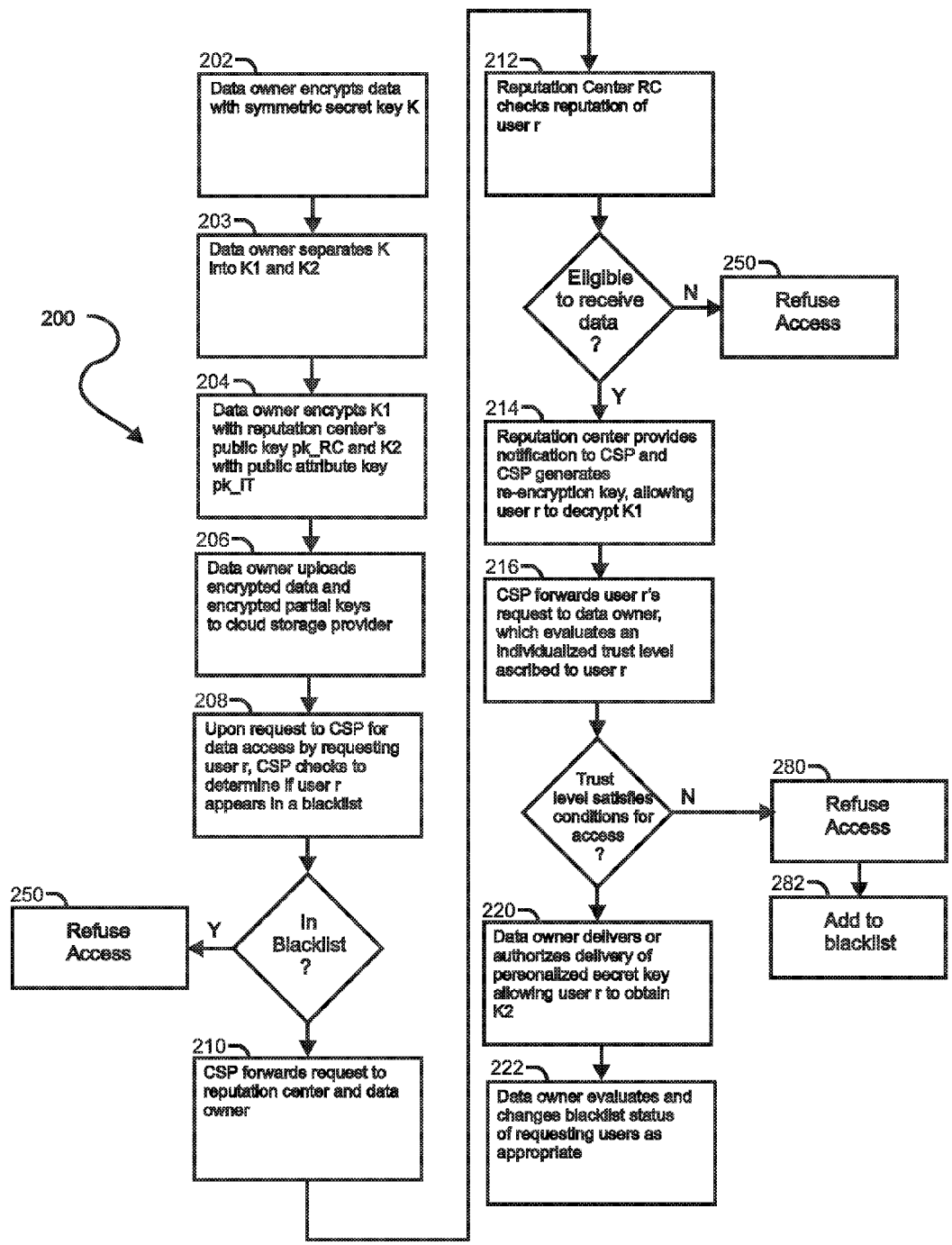
FIG. 2 illustrates a process according to an embodiment of the present invention.

FIG. 2 illustrates a process 200 according to an embodiment of the invention. At step 202, a data owner u1 encrypts its data with a symmetric secret key K. At step 203, the key K is separated into two parts: K1 and K2. It will be recognized that separation into two parts is exemplary and non-limiting, and that the key may be separated into any number of parts depending on the particular goals to be accomplished, such as requiring contributions from a number of entities in order to grant access. At step 204, the data owner encrypts K1 with a reputation center's public key pk_RC and K2 with a public attribute key pk_IT, based on an individual trust attribute. At step 206, the data owner uploads the encrypted data to a cloud storage provider (CSP) and also uploads the above encrypted partial keys to the CSP.

At step 208, upon a request to the CSP for data access by a data requesting user r, the CSP checks to determine if the user r appears in a blacklist. If the user r appears in a blacklist, the process skips to step 250 and access is refused. If the user is not in a blacklist, the process proceeds to step 210 and the CSP forwards the request to the reputation center and the data owner.

At step 212, the reputation center RC checks the reputation of the user r. If the reputation of the user r is such that the user r is ineligible to receive the data, the process skips to step 250 and access is refused. If the reputation of the user r is sufficient to allow the user r to receive the data, the process proceeds to step 214 and the reputation center provides an appropriate notification to the CSP, which then generates a re-encryption key ReEcryption(rk_RC→r; E(pk_RC; K1))=E(pk_r; K1)=CK1. The user r can decrypt CK1 with its private key sk_r to decrypt K1. At step 216, the CSP also forwards the user r's request to the data owner, which evaluates an individualized trust level ascribed to the user r. If the trust level of the user r does not satisfy conditions established by the data owner for access, the process skips to step 280 and access is rejected. Then, at step 282, the user r is added to a blacklist restricting it from access to the data owner's data. If the trust level of the user r satisfies the conditions established by the data owner for access, the process proceeds to step 220 and the data owner u delivers, or authorizes the delivery of, the personalized secret key sk_(IT, u, r) to the user r. This information allows the user r to obtain K2 and by obtaining both K1 and K2, the user r can reconstruct K and gain access to the data owner's data.

At step 222, the data owner evaluates the status of the requesting user r and other potential requesting users, and changes their blacklist status as appropriate.

Figure 3:
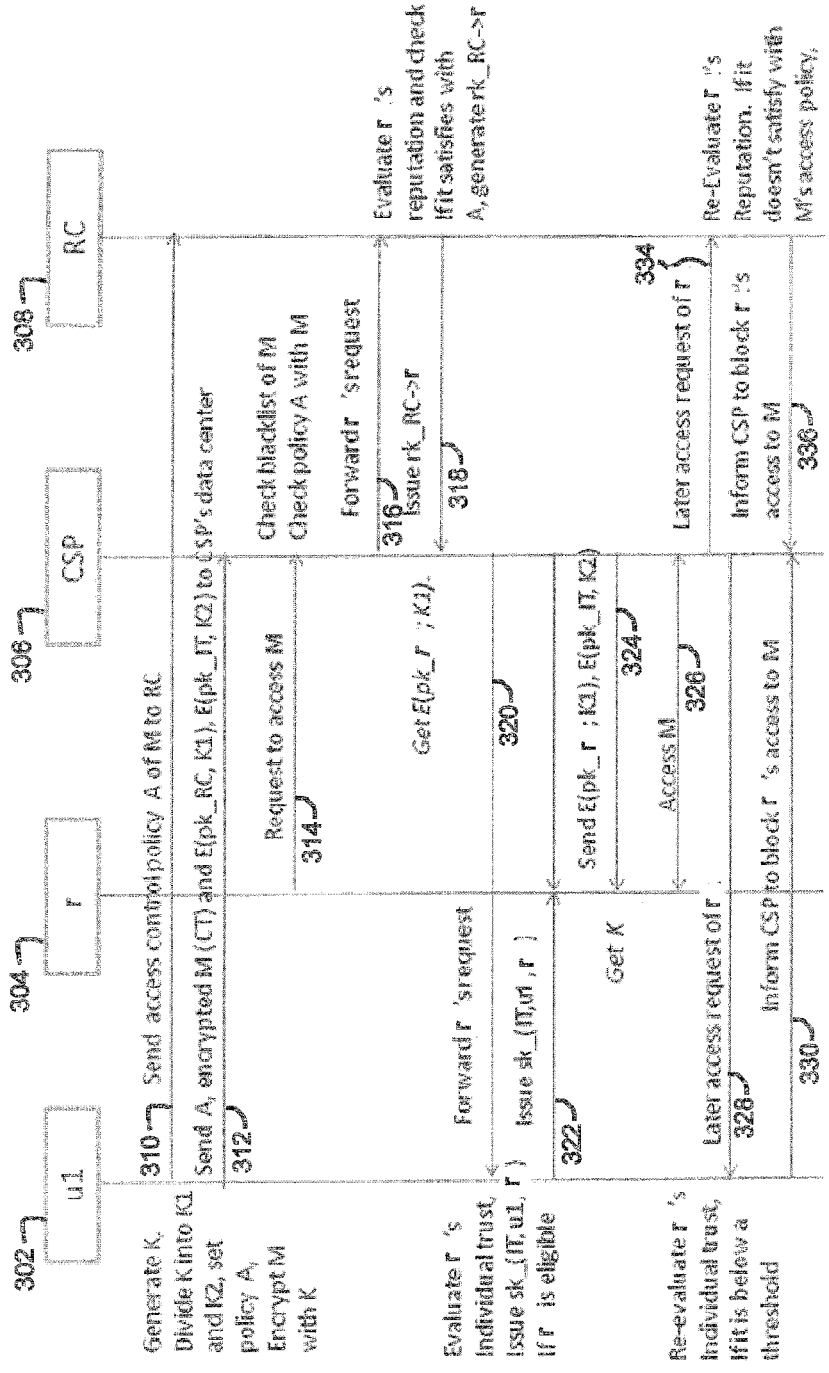
FIG. 3 illustrates information flows and activities according to an embodiment of the present invention.

FIG. 3 illustrates information flows between a data owner 302, a requesting user 304, a cloud storage provider 306, and a reputation center 308. The data owner 302 has saved its sensitive data at the CSP 306, and the requesting user 304 wishes to gain access to the data, as authorized by the data owner 302.

The data owner 302 generates an encryption key K and separates it into two parts K1 and K2. It encrypts data M with a secret key to obtain CT. The data owner also generates a data access policy with regard to an individual trust level threshold and public reputation threshold for M. The data owner 302 performs a transmission 310, sending the access control policy A to the reputation center 3108. The data owner 302 performs an upload 312, uploading the encrypted data CT, policy A, encrypted K1=E(pk_RC, K1) and encrypted K2=E(pk_IT, K2) to the CSP.

The requester 304 performs a request 314 to the CSP to gain access to the data M. The CSP checks the validity of the requester's ID and whether the requester appears in a blacklist. If the requester has presented a valid ID and is not in the blacklist, the CSP 306 performs a transmission 316, forwarding the request to the reputation center 308 and the reputation center 308 evaluates the requester's reputation and determines if it satisfies the access policy A with respect to the data M. If the reputation level is sufficient for allowing access, the reputation center generates rk_RC→r, and the data owner 302 checks the eligibility of the requesting user 304 to obtain the data and generates personalized secret keys for decryption of K2.

The reputation center 308 performs a transmission 318 to the CSP 306, issuing rk_RC→r to the CSP to allow re-encryption of K1, producing E(pk_r, K1). The re-encryption by the CSP allows the requester to produce K1, but the information provided to the CSP does not allow the CSP itself to obtain K1.

The CSP performs a transmission 320 to the data owner 302, forwarding the request to the data owner 302. The data owner 302 evaluates an individual trust assessment of the requester 304 and, if the individual trust assessment is sufficient to allow access to the requester 304, the data owner 302 performs a transmission 322 to issue a personalized secret key sk_(IT, u1, r) to the requester 302. The CSP 306 performs a transmission 324 to deliver encrypted key portions E(pk_r, K1) and E(pk_IT, K2) to the requester 304, and performs a transmission 326 to deliver the data M to the requester 304.

If the trust level of the requester 304 deteriorates, its status with respect to the data of the data owner 302 may change. In such a case, on a subsequent request 328 of the requester 304 to the data owner 302, the data owner 302 may evaluate the individual trust level of the requester 304 and, if the requester's individual trust level is insufficient, perform a transmission 330, informing the CSP 306 to block access by the requester 304. On a subsequent request 334 of the requester 304 to the reputation center 308, the reputation center 308 may evaluate the reputation of the requester 304 and, if the requester's reputation is insufficient, perform a transmission 336, informing the CSP 306 to block access by the requester 304.

FIG. 4 illustrates an exemplary user device 400 according to an embodiment of the present invention, configured to act, for example, as a device controlled by a user of a system such as the system 100, whether by a data owner or a data requester. It will be recognized that a user may take on the role of a data owner or a data requester at different times, under appropriate circumstances. The device is illustrated here as possessing wireless communication capabilities, but it will be recognized that such a configuration is exemplary, and that any number of configurations may be employed.

The user device comprises a data processor 402 and memory 404, with the memory 404 suitably storing data 406 and software 408. The user device 400 further comprises a transmitter 410, receiver 412, and antenna 416. The software 406 stored in memory 404 includes program instructions (software (SW)) that, when executed by the associated data processor 402, enable the user device to operate in accordance with the exemplary embodiments of this invention. That is, the exemplary embodiments of this invention may be implemented at least in part by computer software executable by the DP 402 of the various electronic components illustrated here, with such components and similar components being deployed in whatever numbers, configurations, and arrangements are desired for the carrying out of the invention. Various embodiments of the invention may be carried out by hardware, or by a combination of software and hardware (and firmware).

FIG. 4 also illustrates an exemplary wireless access point 420, allowing communication by wireless communication devices which operated, for example, as part of a wireless local area network or a wireless cellular network.

The access point 420 comprises a data processor 422 and memory 424, with the memory 424 suitably storing data 426 and software 428. The access point 420 further comprises a transmitter 430, receiver 432, and antenna 436. The software 426 stored in memory 424 includes program instructions (software (SW)) that, when executed by the associated data processor 422, enable the user device to operate in accordance with the exemplary embodiments of this invention. That is, the exemplary embodiments of this invention may be implemented at least in part by computer software executable by the DP 402 of the various electronic components illustrated here, with such components and similar components being deployed in whatever numbers, configurations, and arrangements are desired for the carrying out of the invention. Various embodiments of the invention may be carried out by hardware, or by a combination of software and hardware (and firmware). The access point 420 may suitably provide access to the public Internet 440 by devices such as the device 420, and data owners and data requesters may use the public Internet to communicate with data storage and management entities such as CSPs and reputation centers, but it will be recognized that numerous mechanisms are available for access to the Internet and that access to entities such as CSPs and reputation centers may be achieved in numerous different ways, whether through the public Internet or through some other mechanism.

FIG. 4 also shows an exemplary data processing device 450 according to an embodiment of the present invention. The device 450 may, for example, act as or provide services on behalf of a CSP or a reputation center.

The data processing device comprises a data processor 452 and memory 454, with the memory 454 suitably storing data 456 and software 458. The software 458 stored in memory 454 includes program instructions (software (SW)) that, when executed by the associated data processor 452, enable the user device to operate in accordance with the exemplary embodiments of this invention. That is, the exemplary embodiments of this invention may be implemented at least in part by computer software executable by the DP 452 of the various electronic components illustrated here, with such components and similar components being deployed in whatever numbers, configurations, and arrangements are desired for the carrying out of the invention. Various embodiments of the invention may be carried out by hardware, or by a combination of software and hardware (and firmware).

The various embodiments of the user device 400 can include, but are not limited to, cellular phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The memories 404, 424, and 454 may be of any type suitable to the local technical environment and may be implemented using any suitable data storage technology, such as semiconductor based memory devices, flash memory, magnetic memory devices and systems, optical memory devices and systems, fixed memory and removable memory. The data processors 402, 422, and 452 may be of any type suitable to the local technical environment, and may include one or more of general purpose computers, special purpose computers, microprocessors, digital signal processors (DSPs) and processors based on multi-core processor architectures, as non-limiting examples.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. An apparatus, comprising:
at least one processor;
memory storing computer program code;
wherein the memory storing the computer program code is configured to, with the at least one processor, cause the apparatus to at least:
encrypt, using a complete key, stored data, wherein the complete key is usable by a data requester for decryption of the stored data;
divide the complete key into at least a first partial key and a second partial key;
provide, to a first entity, control over delivery of the first partial key to enable the first entity to at least provide, to the data requestor, access to the first partial key, when the data requester is determined to satisfy at least a first criterion, wherein the providing of the control over the delivery of the first partial key includes encrypting the first partial key using a public key associated with the first entity; and
provide, to the data requester, access to the second partial key, when the data requester is determined to satisfy at least a second criterion that is different from the first criterion.

2. The apparatus of claim 1, wherein the apparatus is further configured to at least:
encrypt the second partial key using a public key associated with an owner of the stored data.

3. The apparatus of claim 2, wherein the providing of the access to the second partial key providing, to the data requester, the owner's secret key required for decryption of the second partial key.

4. The apparatus of claim 2, wherein the providing of the access to the second partial key includes encrypting, using apparatus the data requester's public key, the owner's secret key required for decryption of the second partial key such that the data requester is able to obtain, using the data requester's secret key, the owner's secret key.

5. The apparatus of claim 1, wherein the first criterion for delivery of the first partial key includes public reputation information for the data requester.

6. The apparatus of claim 1, wherein the second criterion for delivery of the second partial key includes individualized trust information for the data requester with respect to an owner of the stored data.

7. The apparatus of claim 1, wherein the providing of the access to the first partial key includes re-encrypting, using the data requester's public key, the first partial key such that the data requester is able to obtain the first partial key using the data requester's secret key.

8. The apparatus of claim 1, wherein the complete key is further divided into a third partial key, wherein the apparatus is further configured to at least provide, to a second entity, control over delivery of the third partial key, wherein the second entity controls delivery of the third partial key to the data requester, and wherein the delivery of the third partial key is controlled based on at least one of the first criterion, the second criterion, and a third criterion.

9. The method of claim 1, further comprising:
setting, to a null value, the second partial key, wherein the setting of the second partial key to a null value enables the first entity to exercise full control over the delivery of the first partial key.

10. A method comprising:
encrypting, using a complete key, stored data, wherein the complete key is usable by a data requester for decryption of the stored data;

dividing the complete key into at least a first partial key and a second partial key;

providing, to a first entity, control over delivery of the first partial key to enable the first entity to at least provide, to the data requestor, access to the first partial key, when the data requester is determined to satisfy at least a first criterion, wherein the providing of the control over the delivery of the first partial key includes encrypting the first partial key using a public key associated with the first entity; and providing, to the data requester, access to the second partial key, when the data requester is determined to satisfy at least a second criterion that is different from the first criterion.

11. The method of claim 10, further comprising at least encrypting the second partial key using a public key associated with an owner of the stored data.

12. The method of claim 11, wherein the providing of the access to the second partial key includes providing, to the data requester, the owner's secret key required for decryption of the second partial key.

13. The method of claim 12, wherein the providing of the access to the second partial key includes encrypting, using the data requester's public key, the owner's secret key required for decryption of the second partial key such that the data requester is able to obtain, using the data requester's secret key, the owner's secret key.

14. The method of claim 10, wherein the first criterion for delivery of the first partial key includes public reputation information for the data requester.

15. The method of claim 10, wherein the second criterion for delivery of the second partial key includes individualized trust information for the data requester with respect to an owner of the stored data.

16. The method of claim 10, wherein the providing of the access to the first partial key includes re-encrypting, using the data requester's public key, the first partial key such that the data requester is able to obtain the first partial key using the data requester's secret key.

17. The method of claim 10, wherein the complete key is further divided into a third partial key, wherein control over the delivery of the third partial key is provided to a second entity, wherein the second entity controls delivery of the third partial key to the data requester, and wherein the delivery of the third partial key is controlled based on at least one of the first criterion, the second criterion, and a third criterion.

18. A non-transitory computer readable medium storing a program of instructions, execution of which by a processor configures an apparatus to at least:

encrypt, using a complete key, stored data, wherein the complete key is usable by a data requester for decryption of the stored data;

divide the complete key into at least a first partial key and a second partial key;

provide, to a first entity, control over delivery of the first partial key to enable the first entity to at least provide, to the data requestor, access to the first partial key, when the data requester is determined to satisfy at least a first criterion, wherein the providing of the control over the delivery of the first partial key includes encrypting the first partial key using a public key associated with the first entity; and provide, to the data requester, access to the second partial key, when the data requester is determined to satisfy at least a second criterion that is different from the first criterion.

19. The computer readable medium of claim 18, wherein the apparatus is configured to at least encrypt the second partial key using a public key associated with an owner of the stored data.

20. The computer readable medium of claim 19, wherein the providing of the access to the second partial key includes providing, to the data requester, the owner's secret key required for decryption of the second partial key.

21. The computer readable medium of claim 18, wherein the first criterion for delivery of the first partial key includes public reputation information for the data requester.

22. The computer readable medium of claim 18, wherein the second criterion for delivery of the second partial key includes individualized trust information for the data requester with respect to an owner of the stored data.

23. The computer readable medium of claim 18, wherein the providing of the access to the first partial key includes re-encrypting, using the data requester's public key, the first partial key such that the data requester is able to obtain the first partial key using the data requester's secret key.

24. The computer readable medium of claim 18, wherein the providing of the access to the second partial key includes encrypting, using the data requester's public key, the owner's secret key required for decryption of the second partial key such that the data requester is able to obtain, using the data requester's secret key, the owner's secret key.

* * * * *